US012748184B2

(12) United States Patent
Vuong et al.

(10) Patent No.: US 12,748,184 B2
(45) Date of Patent: Sep. 29, 2026

(54) TEST AIRBORNE ACCUMULATIVE PULSE RADAR WARNING SYSTEM

(71) Applicant: VIETTEL GROUP, Ha Noi City (VN)

(72) Inventors: Dinh Phong Vuong, Ha Noi City (VN); Duc Thang Ngo, Ha Noi City (VN)

(73) Assignee: VIETTEL GROUP, Ha Noi City (VN)

( * ) Notice: Subject to any disclaimer, the term of this patent is extended or adjusted under 35 U.S.C. 154(b) by 252 days.

(21) Appl. No.: 18/625,567

(22) Filed: Apr. 3, 2024

(65) Prior Publication Data

US 2024/0361429 A1 Oct. 31, 2024

(30) Foreign Application Priority Data

Apr. 27, 2023 (VN) .............................. 1-2023-02843

(51) Int. Cl.
*G01S 7/40* (2006.01)

(52) U.S. Cl.
CPC .................................. *G01S 7/4086* (2021.05)

(58) Field of Classification Search
USPC .......................................... 342/165, 169–174
See application file for complete search history.

(56) References Cited

U.S. PATENT DOCUMENTS 3,199,107 A * 8/1965 Mills ......................... G01S 7/40 342/170
4,106,345 A * 8/1978 Saunders ................ G01S 1/028 342/170
4,467,327 A * 8/1984 Drake ................... G01S 7/4052 434/2
4,621,265 A * 11/1986 Buse ..................... G01S 7/4052 374/2
11,069,982 B2 * 7/2021 Cobb .................... G01S 7/4086

* cited by examiner

*Primary Examiner* — Bernarr E Gregory
(74) *Attorney, Agent, or Firm* — patenttm.us

(57) ABSTRACT

A testing system for the accumulation of airborne collision warning Radio Frequency Airborne Accumulative Pulse Radar Warning SystemF pulse systems in space, to test the Radio Frequency Airborne Accumulative Pulse Radar Warning System collision warning pulse accumulation device. The system is utilized in laboratory settings or to assess the functionalities, parameters, and readiness of the Radio Frequency Airborne Accumulative Pulse Radar Warning System equivalent to its real-world operation. It also allows for monitoring and evaluating the operation of the entire RF system through signal communication transmitted from the Radio Frequency Airborne Accumulative Pulse Radar Warning System to the simulation system.

1 Claim, 1 Drawing Sheet

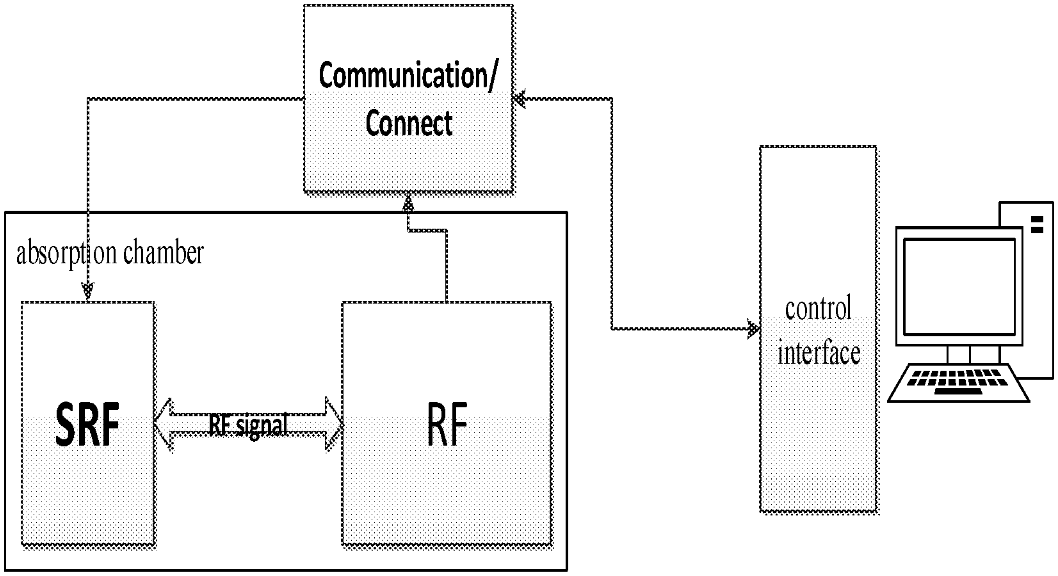
Communication/
Connect
absorption chamber
SRF
RF signal
RF
control
interface

TEST AIRBORNE ACCUMULATIVE PULSE RADAR WARNING SYSTEM

REFERENCE

The invention of a test airborne accumulative pulse radar warning system is extremely important to test the RF Collision Warning System. Specifically, the system mentioned in the disclosure is used to evaluate the performance of RF in a laboratory environment prior to conducting tests in the final product.

TECHNICAL FIELD OF INVENTION

The Radio Frequency Airborne Accumulative Pulse Radar Warning System (RFAAPRWS) for Target Detection in the Affected Area of an Unmanned Aerial Vehicle (UAV) is a form of pulse radar used to identify the region with the highest potential impact of a high-speed UAV and targets in space. It plays a crucial role in ensuring the effective operation of the UAV as the primary sensor in the final phase of target engagement. Determining whether the target is within the affected area of the UAV is a critical factor for the success of the mission. The essential requirement is a system that can conveniently and accurately assess the performance of the RF against predefined technical objectives, both in practical usage and during system development.

In order to test the operation of the RFAAPRWS, a simulation system is required to generate scenarios, simulate corresponding return pulse signals, and replicate the operational environment similar to that of space, accurately reflecting the actual operation of the RFAAPRWS-equipped device and a target with specific characteristics.

Currently, there is no method available to address all these issues for testing and evaluating RFAAPRWS.

SUMMARY OF THE INVENTION

The purpose of the invention is to develop a system capable of generating scenarios, simulating corresponding return pulse signals to the transmitted pulse signals, and replicating the operational environment as if it were on the RFAAPRWS-equipped airborne device. The system includes hardware components used as a simulator and a computer running Ubuntu 16.04 or higher operating system. The control software, developed by the authors' team, runs on Ubuntu 16.04 and contains user interfaces through which users can send control commands, vary simulated pulses, assess the system's response, and a high-frequency wave absorption chamber of sufficient size and isolation value to create an environment similar to RF operations in space.

To achieve this objective, the proposed invention includes the following components in the system:

- The simulation block is a device that serves to generate shifted signals corresponding to distance and the simulated scenario;
- A computer running Ubuntu 16.04 operating system is used to execute software containing control and user interfaces;
- The RS422-based communication device is used to transmit and receive data between the altitude simulation block, RF, and the control and user interfaces;
- The control and user interfaces demonstrate the operation of the RFAAPRWS, allowing control over the variations in assessment scenarios;

- The high-frequency signal absorption chamber creates a space for arranging the SRF and RFAAPRWS to emit and respond to corresponding simulated pulse signals;

BRIEF DESCRIPTION OF THE DRAWINGS

FIG. 1: Overview of the test airborne accumulative pulse radar warning system

DETAILED DESCRIPTION OF THE SYSTEM

FIG. 1 illustrates the main components of the system:

- Digital simulation block (SRF);
- High-frequency signal absorption chamber;
- Computer running Ubuntu 16.04 operating system;
- RS422-based communication device;
- Control and user interfaces;
- In which, the computer must require the following specifications to run the Ubuntu 16.04 operating system:
  - Minimum RAM requirement: 4 GB;
  - Minimum hard disk requirement: 500 GB HDD and 128 GB SSD;
    - Minimum CPU: Core i5, minimum clock speed 2.5 GHz;
    - Screen: minimum 15.6 inch.

The RS422 protocol communication device between the test system and user interface's software and the SRF and RF includes the following information and parameters:

| Number | Field | Description |
|---|---|---|
| 1 | Connection cable | RS422 with Female and Male DB-9 Connector |
| 2 | Baudrate | 962100 bps |
| 3 | Parity bit | None |
| 4 | Data bit | 8 |
| 5 | Stop bit | 1 |
| 6 | Synchronize status | 2 |

The simulation block (SRF) consists of a system of high-frequency transceivers, signal processing, and software. The SRF receives RF signals combined with control signals from the control interface, computes and simulates pulse signals similar to those reflected from real targets based on the simulated effective reflection area of the target. These simulated signals are then radiated into space with pulse parameters resembling the RF transmission, but with adjusted signal delay and intensity according to the simulated scenario. In which:

- High-frequency RF transceivers: consist of two sets of transmitters and receivers for capturing RF signals and retransmitting them into space. Additionally, they include attenuation modules to adjust the output signal intensity corresponding to the simulated altitude.
- Signal processing system and software: based on the received RF signals and the simulated scenario, including but not limited to parameters such as distance and characteristics of the target, as well as the intended purpose of the RFAAPRWS for the airborne device, the system processes and controls the signals emitted from the corresponding transmitter block to simulate the test. The signal processing system and software also include interfaces for communication, control, and monitoring of the SRF and RFAAPRWS operations, capable of storing data for testing and troubleshooting purposes during the testing process. The user interface contains the following subsystems:

The control interface with SRF includes:

Control signals to modify the target's distance and velocity.

Control signals to modify the speed of the carrying device.

Control signals to modify the radar cross section (RCS) of the target.

Control signals to modify the operational behavior of the RFAAPRWS target.

The monitoring interface returned from the RF signals includes:

Signal to display the active status of the RF frequency generator.

Signal to display the presence of target.

In case there is the presence of target, display the range to target.

The RF input power value.

The high-frequency signal absorption chamber: absorbs high-frequency signals to eliminate unwanted reflections from the surrounding environment, requiring absorption levels in the RF operating frequency range of >40 dB. The minimum dimensions in length, width, and height are 10 m, 5 m, and 6 m, respectively, to accommodate the radiation field of the RF antenna as well as the arrangement of testing equipment.

ACHIEVED RESULT

The test and evaluation simulation system for the RFAAPRWS invention enables comprehensive testing of its functionalities, facilitating development and quality assurance of the product prior to deployment. This system offers numerous benefits, such as:

Easy to detect error in the early stage of product.

Low power consumption, high energy savings.

Ensure testing for a robust RFAAPRWS system.

Cost-effective and multi-scenario testing of RF algorithms, including scenarios that may be difficult to reproduce in real-world conditions.

The invention claimed is:

1. A test airborne accumulative pulse radar warning system includes the required components:

a computer with the following specifications to run the Ubuntu 16.04 operating system:

a Minimum of 4 GB RAMn (Random Access Memory);

a Minimum hard disk of 500 GB HDD and 128 GB SSD;

a Minimum Core i5 CPU (Central Processing Unit), with a minimum clock speed 2.5 GHz;

a minimum 15.6 inch size screen;

a RS422 protocol communication device between the test airborne accumulative pulse radar warning system and a user interface and a simulation block (SRF) and Radio Frequency Airborne Accumulative Pulse Radar Warning System includes the following information and parameters:

| Number | Field | Description |
|---|---|---|
| 1 | Connection cable | RS422 with Female and Male DB-9 Connector |
| 2 | Baudrate | 962100 bps |
| 3 | Parity bit | None |
| 4 | Data bit | 8 |
| 5 | Stop bit | 1 |
| 6 | Synchronize status | 2 |

the simulation block (SRF) encompasses a system of simulation of high-frequency transceivers, signal processing, and processing control, the SRF receives RF signals wirelessly, analyzes them, and re-radiates them into space with pulse parameters resembling the RF signals, while adjusting signal delay and intensity according to a simulated scenario, in which:

high-frequency transceivers: receive wireless signals emitted from a Radio Frequency Airborne Accumulative Pulse Radar Warning System, adjust attenuation according to a control of the signal processing and processing control, and then retransmit the pulse signals back into space through high-frequency transmitter devices;

the signal processing and software are configured to generate and process control signals and monitoring signals for testing operation of the Radio Frequency Airborne Accumulative Pulse Radar Warning System based on input signals received at a high-frequency block and from a control interface's signals and parameters, the control interface with SRF includes:

Control signals to modify a target's distance and velocity;

Control signals to modify a speed of a carrying device;

Control signals to modify a radar cross section (RCS) of the target;

Control signals to modify the operational behavior of the Radio Frequency Airborne Accumulative Pulse Radar Warning System target;

a monitoring interface returned from the Radio Frequency Airborne Accumulative Pulse Radar Warning System signals includes:

a signal to display an active status of a RF frequency generator;

a signal to display a presence of the target;

in case there is the presence of target, display a range to target;

an RF input power value;

an absorption chamber comprising a sealed chamber equipped with electromagnetic field absorbers capable of absorbing unwanted reflected wireless signals, to simulate the operating conditions of the Radio Frequency Airborne Accumulative Pulse Radar Warning System in free space.

* * * * *